Oct. 23, 1962 E. J. FORSYTH 3,059,787
METHOD AND APPARATUS FOR STACKING ARTICLES
Filed Jan. 21, 1960 3 Sheets-Sheet 1

FIG. I

INVENTOR
EMIL J. FORSYTH

BY
Mead, Browne, Schuyler & Beveridge
ATTORNEYS

Oct. 23, 1962  E. J. FORSYTH  3,059,787
METHOD AND APPARATUS FOR STACKING ARTICLES
Filed Jan. 21, 1960  3 Sheets-Sheet 2

INVENTOR
EMIL J. FORSYTH
BY
ATTORNEYS

Oct. 23, 1962 E. J. FORSYTH 3,059,787
METHOD AND APPARATUS FOR STACKING ARTICLES
Filed Jan. 21, 1960 3 Sheets-Sheet 3
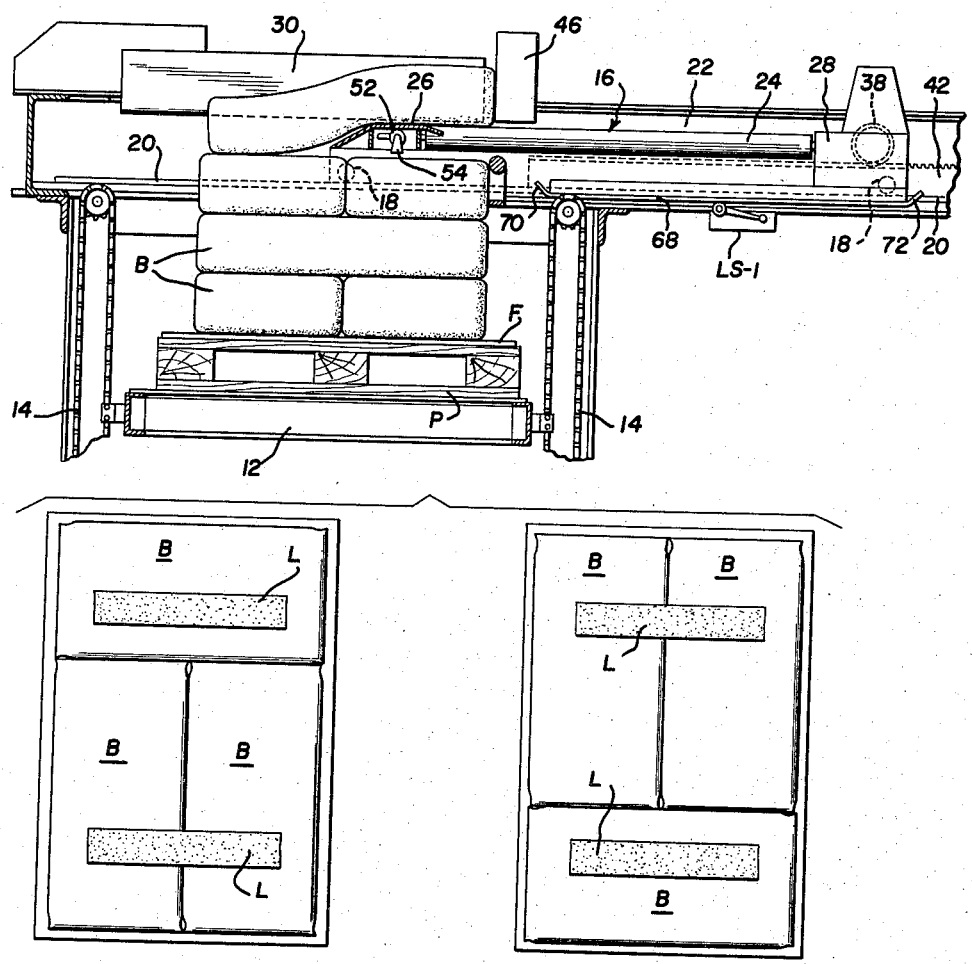
FIG.5
FIG.6
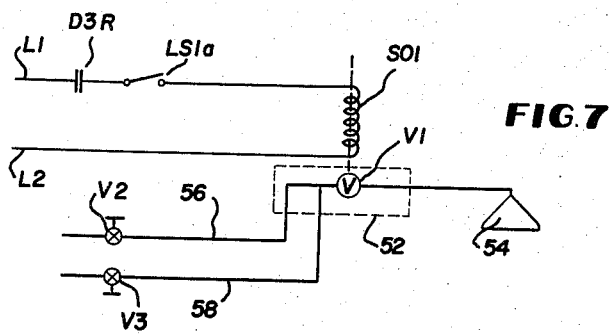
FIG.7
INVENTOR
EMIL J. FORSYTH
BY
Mead, Browne, Schuyler & Beveridge
ATTORNEYS

United States Patent Office 3,059,787
Patented Oct. 23, 1962

3,059,787
METHOD AND APPARATUS FOR
STACKING ARTICLES
Emil J. Forsyth, Ellwood City, Pa., assignor to Mathews Conveyer Company, Ellwood City, Pa., a corporation of Pennsylvania
Filed Jan. 21, 1960, Ser. No. 3,800
6 Claims. (Cl. 214—6)

This invention relates to methods and apparatus for stacking articles, and more particularly to methods and apparatus for increasing the stability of an assembled stack of articles.

The invention is especially adapted for use in article handling operations wherein articles are fed into a pallet loading machine and automatically assembled into multi-layered stacks upon a pallet. The term "articles" comprehends containers such as bags, cartons, bales, etc., generally of uniform size. In the usual case the articles are arranged into layers and then formed into a stack by successively stacking the assembled layers on top of each other. While the stacks of some articles are reasonably stable, others may break down as a result of vibration and jostling resulting from handling in warehousing and shipping operations.

One object of the invention is to provide a method and apparatus for increasing the stability of an assembled stack of articles.

Another object of the invention is to provide methods and apparatus for increasing the adherence between individual layers of a stack.

Still another object of the invention is to provide apparatus for adhesively bonding adjacent layers of a stack of articles to each other which may be readily incorporated in existing article stacking machines.

Still another object of the invention is to provide a method for adhesively bonding adjacent layers of a stack of articles to each other which does not interfere with the normal operation of existing article stacking machines.

Still another object of the invention is to provide a method for adhesively bonding adjacent layers of a stack of articles to each other wherein the adhesive bonding material is applied in a manner which does not interfere with the handling of the articles and in which the bonding material is omitted from undesired locations.

The foregoing, and other objects are achieved in a conventional pallet loading machine of the type wherein an article supporting apron is mounted for reciprocation at the upper end of a pallet lift shaft. A lift operating in a lift shaft is vertically movable to position either a pallet supported upon the lift or the uppermost layer of articles supported upon the pallet immediately below the apron. Articles are assembled upon the apron into a layer by arranging the articles in selected patterns. When the layer of articles is assembled upon the apron, the apron is withdrawn from beneath the layer of articles and the articles drop to the supporting surface immediately below the apron provided by the pallet or preceding layer of articles.

In order to increase the stability of the stack assembled by conventional machines of this type, a plurality of spray nozzles are mounted upon the underside of the apron and connected through suitable control valves to a supply of liquid adhesive under pressure. The control valves are automatically operated by movement of the apron from its normal to its retracted position to spray strips of liquid adhesive upon the uppermost surface of the pallet or stack below the apron. The layer of articles being stripped by the withdrawing movement of the apron thus drops directly onto a surface freshly coated with strips of liquid adhesive.

By the above outlined apparatus and method, several advantages are achieved. First, the adhesive is applied just prior to contact between the two surfaces which are to be bonded. No liquid adhesive is applied to the topmost layer of the stack, but is automatically applied to the pallet to achieve a bond between the pallet and the lowermost layer of the stack. In previously known methods, glue is usually applied to the tops of the articles as they are fed into the layer assembly area. When this particular method is employed, glue is omitted between the bottom layer and the pallet and is applied to the top of the uppermost layer. Other methods which apply glue to the bottoms of the bags by pick-up wheels or rollers frequently do so at a location wherein problems arise in conveying and positioning the articles after the glue has been applied to the bottom surface.

Other objects and features of the invention will become apparent by reference to the following specification and to the drawings.

In the drawings:

FIG. 5 is a side elevational view, partially in cross-section, looking into one side of the pallet lift shaft;

FIG. 6 is a diagramatic view showing alternative patterns of article layers; and, FIG. 7 is a schematic diagram of an exemplary adhesive supply control system.

Figure 3:
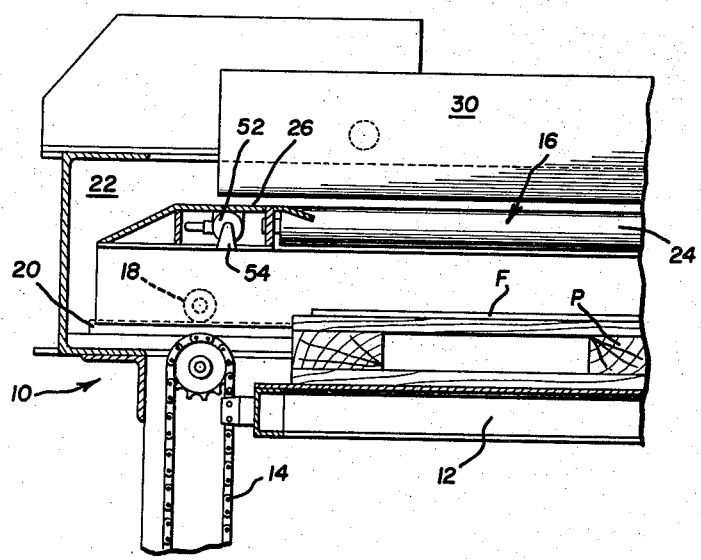
FIG. 3 is a detail cross-sectional view taken on the line 3—3 of FIG. 1.
Figure 4:
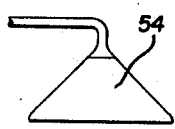
FIG. 4 is a front detail view of one of the spray nozzles.

In the drawings, a well-known type of pallet loading machine is shown which includes a machine frame 10 which defines a vertically extending shaft within which a pallet lift 12 (FIGS. 3 and 5) may be raised and lowered by a set of motor driven chains 14. At the upper end of the lift shaft, an apron or movable platform 16 is supported for generally horizontal movement as by rollers 18 upon tracks 20 mounted in each of a pair of spaced side channels 22 on frame 10.

Apron 16 includes a plurality of power driven rollers 24 rotatively supported at each end in front and rear apron frame members 26 and 28. Rollers 24 are driven in rotation to drive articles supported thereon toward back stop assembly 30 on frame 10. The mechanism for driving rollers 24 is well-known and may include a conventional drive motor 32 and speed reducer 34 mounted upon rear frame member 28 of the apron and coupled to the respective rollers by mechanism well-known to those skilled in the art.

Figure 1:
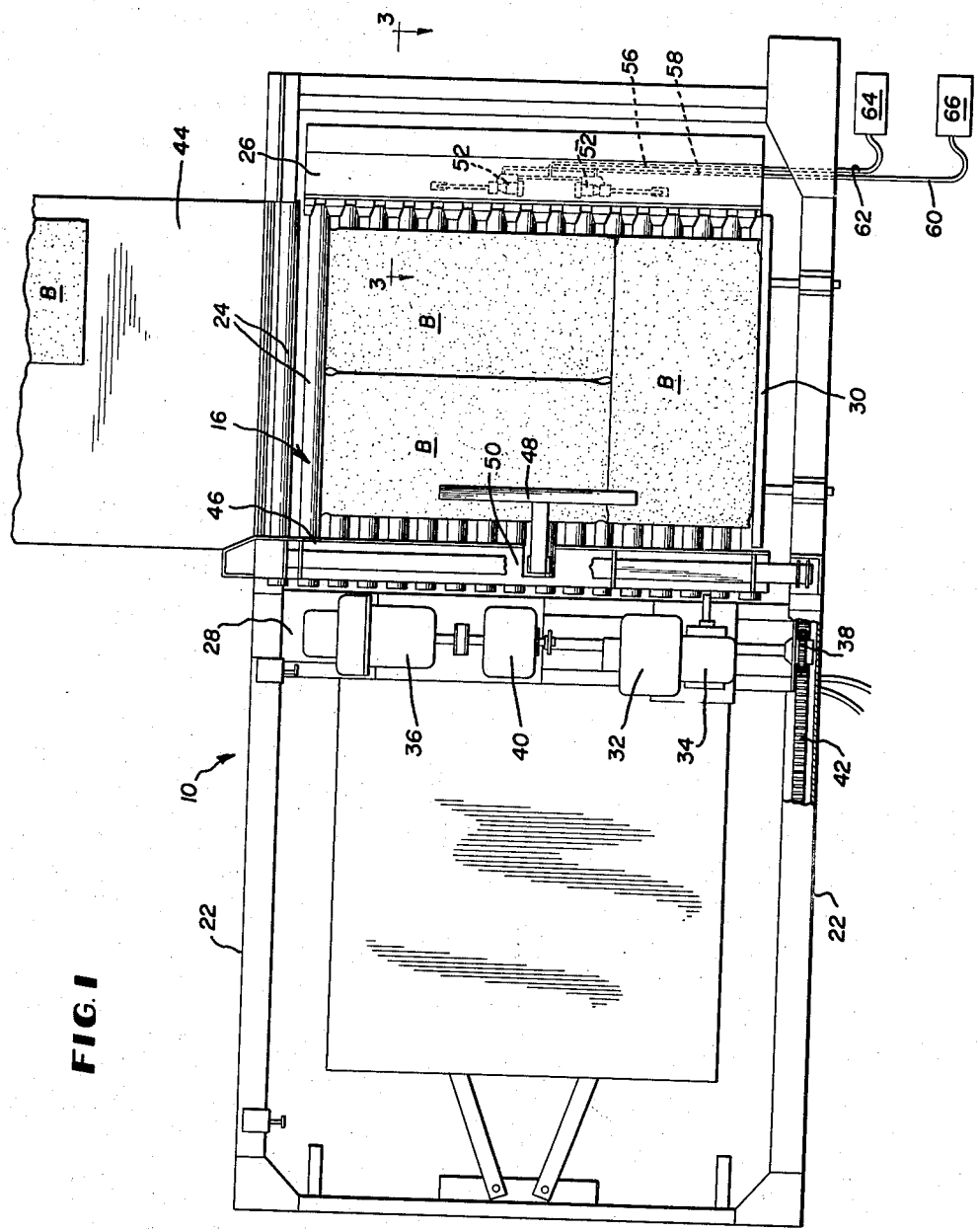
FIG. 1 is a top plan view of an article stacking machine embodying the present invention.
Figure 2:
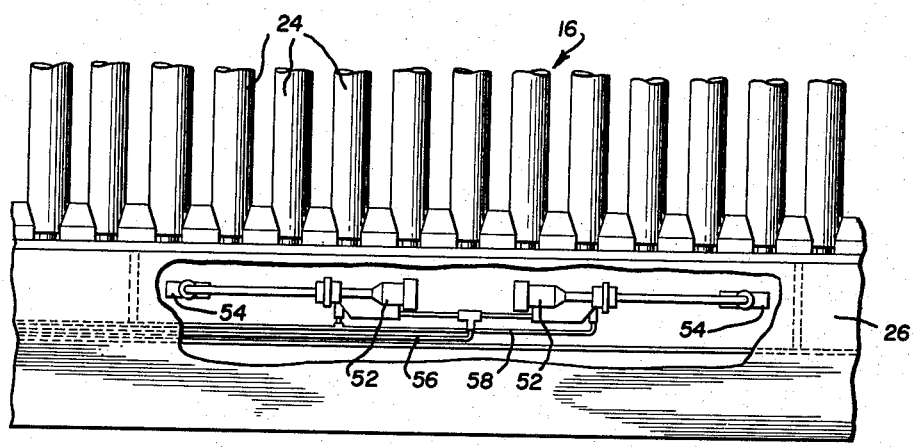
FIG. 2 is a detail plan view of a portion of the front edge of the apron of the machine of FIG. 1 with certain parts removed or omitted to show structural details.

Rollers 18 support apron 16 for generally horizontal movement between the normal position shown in FIG. 1 in which the apron overlies pallet lift 12 and a retracted pisition wherein apron 16 is driven to the left-hand end (FIG. 1) of side channels 22. The apron is driven between the respective end positions by a reversible drive motor 36 which is coupled to drive a pinion gear 38 through a speed reducer 40. Pinion 38 is meshed with a stationary rack 42 fixedly mounted upon one of side channels 22.

In normal operation of the machine described thus far articles to be stacked, such as grain bags B, are fed onto apron 16 from an infeed conveyor 44 when the apron is located in its normal position overlying pallet lift 12. The articles are arranged into a generally rectangular layer as shown in FIG. 1. When the layer is completed, apron drive motor 36 is energized to drive apron 16 to the left as viewed in FIG. 1. A stationary stripper bar 46 is fixedly mounted upon frame 10 at a location slightly above the apron as best shown in FIG. 5. As the apron moves to the left in FIG. 1, stripper bar 46 engages the rear (left) side of the rectangular layer of articles and thus holds the articles against horizontal movement as the apron is withdrawn rearwardly (to the left in FIG. 1) from beneath the articles. In normal operation, lift platform 12 will be located immediately beneath the apron and as the apron is withdrawn from beneath the articles, the articles drop downwardly onto the pallet lift.

The lift control mechanism is actuated, when the apron is at its fully withdrawn position to lower the pallet lift 12 until the layer of articles supported by the lift is located below the horizontal path of the apron. The lift control mechanism may include an arm 48 pivotally supported upon stripper bar 46 and movable into the pallet lift shaft into engagement with the upper surface of the layer of articles on the apron. The arm is gravitationally maintained in contact with the articles as the pallet lift is lowered within the lift shaft. When the lift reaches the desired location the arm actuates suitable mechanism to stop further lowering movement of the lift. The arm is then automatically elevated and suitable control mechanism automatically actuates apron drive motor 36 to return apron 16 to the position shown in FIG. 1. The foregoing cycle is continuously repeated, the lift being lowered one step subsequent to each transfer of a layer of articles to the lift by retracting movement of the apron.

The structure described thus far is quite typical in the pallet loading field and details of the various control mechanisms for achieving the interrelated movement between the apron and lift are well-known to those skilled in the art. One example of a suitable machine of this type is that disclosed in the copending application of Warren S. Raynor Serial No. 605,025 filed August 20, 1956.

To increase the stability of the stack of articles assembled upon the lift, the individual layers of articles are bonded to each other by applying a coating of liquid adhesive to the surface to be contacted by each layer of articles as the layer is being stripped from the apron. The bonding material is preferably applied to the desired surface by spraying liquid adhesive downwardly from fixed locations on the lower side of the apron during the rearward or retracting movement of the apron. By applying the bonding material in this manner, the material is applied to the surface just prior to the contact of the surface by the article to be bonded thereto. A coating of liquid adhesive is automatically applied to the surface to be contacted by the lowermost layer of articles, this particular surface preferably taking the form of a fiber board or continuous sheet surface F secured to the top of the pallet. Application of adhesive or bonding material to the uppermost layer of the stack is automatically omitted.

Application of liquid adhesive in the foregoing manner may be achieved by the use of a plurality of spray guns 52 mounted on the underside of front frame member 26 of the apron. Spray guns 52 may be of any suitable commercially available type, the particular machine shown in the application employing two DeVilbiss type AGA automatic spray guns, each provided with a 90° fan-type spray nozzle 54. Supply lines for liquid adhesive and air such as lines 56 and 58 are coupled to the guns 52 and brought out to a location adjacent one side of the apron from which they are connected as by flexible supply lines such as 60 and 62 to sources of compressed air 64 and a liquid adhesive reservoir 66, schematically shown in FIG. 1 and located at any convenient location upon frame 10.

Control of the spray guns is accomplished by an elongated cam flange 68 fixedly mounted upon one side of the apron 16 (FIG. 5). Cam flange 68 projects outwardly from one side of the apron and is provided with upturned sections 70 and 72 at the front and rear ends respectively. A limit switch LS1 is mounted upon the adjacent side channel 22 at a location where its striker projects into the path of cam flange 68. Limit switch LS1 is of the normally open type, the contacts of the switch being open when its striker is in a normal elevated position. Engagement of the striker by cam flange 68 depresses the striker to close the switch contacts.

A schematic diagram of the spray gun control system is shown in FIG. 7. The conventional spray gun control valve V1 is coupled to solenoid SO1 to be closed when the solenoid is de-energized and to open when the solenoid is energized. Solenoid SO1 is connected to electrical supply lines L1 and L2 in series with two normally open electrical contacts. Contact LS1a represents the electrical contacts of limit switch LS1. A second normally open, relay controlled contact D3R is connected in series with contact LS1a. Relay controlled contacts D3R are operated from the normal pallet loader control system and are coupled into the apron drive motor control circuit in such a fashion that contacts D3R are closed whenever the apron drive motor 36 is energized in a direction to drive the apron in rearward or retracting movement. When the apron is stationary or when the apron is in motion to return to the normal position of FIG. 1, contacts D3R are open.

Assuming the apron to be located in the FIG. 1 position with an assembled layer of articles supported on the apron in condition to be deposited upon the lift, apron drive motor 36 is energized to drive the apron in rearward or retracting movement by the pallet loading machine control circuit. Such a circuit is disclosed in detail in the aforementioned application Serial No. 605,025. With motor 36 energized in the foregoing manner, contacts D3R are closed. As the apron moves toward its retracted position, to the right as viewed in FIG. 5, the rearward inclined surface 72 on cam flange 68 engages limit switch LS1 to depress its striker, thereby closing contacts LS1a. With the apron moving toward its retracted position and the striker of the limit switch depressed by cam flange 68, solenoid SO1 is energized to open valve V1 thereby permitting a spray of liquid adhesive to be discharged from the respective nozzles 54. The spray is continued throughout a desired portion of the rearward movement of the apron, resulting in a strip of liquid adhesive L to be applied either to the upper surface of the pallet or the upper surface of the uppermost layer of articles supported thereon immediately beneath the apron. As the apron approaches its fully retracted position, inclined portion 70 passes to the right of the striker of limit switch LS1, thus permitting the strike to reutrn to its normal position and thereby open contact LS1a to de-energize solenoid SO1 and shut off the spray.

During the return movement of the apron, to the left as viewed in FIG. 5, the striker of limit switch LS1 is depressed to close its contact. However, during return movement of the apron relay control contacts D3R are open and hence no spray is discharged from the spray nozzles during the return movement of the apron.

In addition to the conventional operating valve V1 associated with each spray gun 52, manual shut off valves V2 and V3 are connected at suitable locations in the air and liquid adhesive supply lines.

Referring now to FIG. 6, in the specific embodiment disclosed, the machine is employed to stack 100 pound multiwall paper starch bags upon a pallet. The dimensions of the bag are such that its length is approximately equal to twice its width and three bags form a layer of convenient size. To achieve the optimum bonding between the bags, alternate layers in the stack are arranged in the different patterns as shown in FIG. 6. The location of spray nozzles 54 transversely of the front side of apron 16 is selected to be such that a strip of liquid adhesive will be applied to each article in each layer and the respective layers are so arranged that a given article in any layer is contacted in the region of the adhesive strip by two articles of either next adjacent layer. It will be appreciated that the alternate layer patterning is not limited to articles of the specific relative dimensions shown and that layers of greater numbers of articles are equally well adapted to the practice of the invention. In any case, the number of spray nozzles 54 employed will usually be equal to the number of front to rear rows of articles in each layer and the nozzles will be located in vertical alignment with the respective rows.

While an exemplary embodiment of the invention has been described, it will be apparent to those skilled in the art that the disclosed embodiment may be modified. Therefore, the foregoing description is to be considered exemplary rather than limiting and the true scope of the invention is that defined in the following claims.

I claim:

1. An article stacking apparatus comprising a lift, an apron adapted to support a layer of articles to be stacked, means mounting said apron for movement above said lift between a normal position overlying said lift and a retracted position offset from said lift, means for stripping a layer of articles from said apron during movement of said apron from said normal position toward said retracted position to deposit said layer of articles on said lift, means on said apron for spraying liquid adhesive downwardly from said apron toward said lift, and means controlled by movement of said apron for operating said spraying means during movement of said apron from said normal position toward said retracted position.

2. An article stacking machine comprising a lift, an apron adapted to support a layer of articles, means supporting said apron for substantially horizontal movement above said lift between a normal position overlying said lift and a retracted position offset from said lift, means for stripping a layer of articles from said apron during movement of said apron from said normal position toward said retracted position to deposit said layer of articles on said lift, a plurality of downwardly pointing nozzles mounted upon the lower side of said apron at positions spaced transversely across said apron with respect to the direction of movement of said apron, a supply of liquid adhesive under pressure, and means operated during movement of said apron toward said retracted position for connecting said supply of adhesive to said nozzles to discharge a spray of liquid adhesive from said nozzles toward said lift.

3. An article stacking machine comprising a frame defining a lift shaft having front and rear sides, a lift movable vertically within said shaft, an apron adapted to support a rectangular layer of articles, means supporting said apron upon said frame for movement across the upper end of said lift shaft between a normal position wherein said apron overlies said shaft with the front edge of said apron adjacent the front side of said shaft and a retracted position wherein the front edge of said apron is located rearwardly of the rear side of said shaft, means for driving said apron between said normal and said retracted positions, a stripper bar on said frame extending across the rear side of said lift shaft above said apron and operable to strip articles over the front edge of said apron during rearward movement of said apron to deposit said articles upon said lift, a plurality of downwardly pointing spray nozzles fixedly mounted upon the lower side of said apron at transversely spaced locations across the front edge thereof, valve controlled liquid adhesive supply means coupled to said spray nozzles actuable to supply liquid adhesive to said nozzles, and means for actuating said valve controlled means during rearward movement of said apron.

4. An article stacking machine comprising a frame defining a lift shaft having front and rear sides, a lift movable vertically within said shaft, an apron adapted to support a rectangular layer of articles, means supporting said apron upon said frame for movement across the upper end of said lift shaft between a normal position wherein said apron overlies said shaft with the front edge of said apron adjacent the front side of said shaft and a retracted position wherein the front edge of said apron is located rearwardly of the rear side of said shaft, means for driving said apron between said normal and said retracted positions, a stripper bar on said frame extending across the rear side of said lift shaft above said apron and operable to strip articles over the front edge of said apron during rearward movement of said apron to deposit said articles upon said lift, a plurality of downwardly pointing spray discharge nozzles mounted upon the lower side of said apron adjacent the front edge thereof, means for supplying liquid adhesive to each of said nozzles during rearward movement of said apron to spray a plurality of rearwardly extending strips of liquid adhesive coating upon a surface supported by said lift below said apron, said spray nozzles being transversely spaced across said apron to cause each article of a rectangular layer of articles stripped from said apron by rearward movement thereof to contact at least one of said strips of liquid adhesive.

5. In an article stacking process employing a vertically movable stack support located beneath a horizontally movable platform; the method of assembling and bonding articles into a multi-layered stack comprising the steps of locating said platform in a normal position overlying said support, arranging a plurality of articles on said platform into a rectangular layer having front and rear sides within which said articles are arranged in a plurality of rows extending from front to rear of said layer, withdrawing said platform rearwardly from beneath said layer to deposit the layer on said support, discharging a plurality of downwardly directed sprays of liquid adhesive from said platform toward said support from locations spaced transversely across the front portion of said platform in vertical alignment with said rows of articles during rearward movement of said platform, lowering said support to locate the layer of articles supported thereon below said platform, returning said platform to its normal position, cyclically repeating the foregoing sequence of steps to assemble and bond successive layers of articles into said stack.

6. The method as defined in claim 5 wherein successive layers of articles are arranged in alternate patterns wherein each article in one layer of said stack is contacted by and bonded to at least two articles in the next adjacent layer.

References Cited in the file of this patent

UNITED STATES PATENTS

| | | |
|---|---|---|
| 2,564,492 | Moffat | Aug. 14, 1951 |
| 2,684,049 | Hollis | July 20, 1954 |
| 2,765,838 | Brown | Oct. 9, 1956 |
| 2,813,638 | Miller | Nov. 19, 1957 |